Sept. 13, 1966  C. MAZZONI  3,271,834
MACHINES FOR STAMPING TABLETS OF SUBSTANCES
HAVING A PASTY CONSISTENCY
Filed May 21, 1965  12 Sheets-Sheet 1
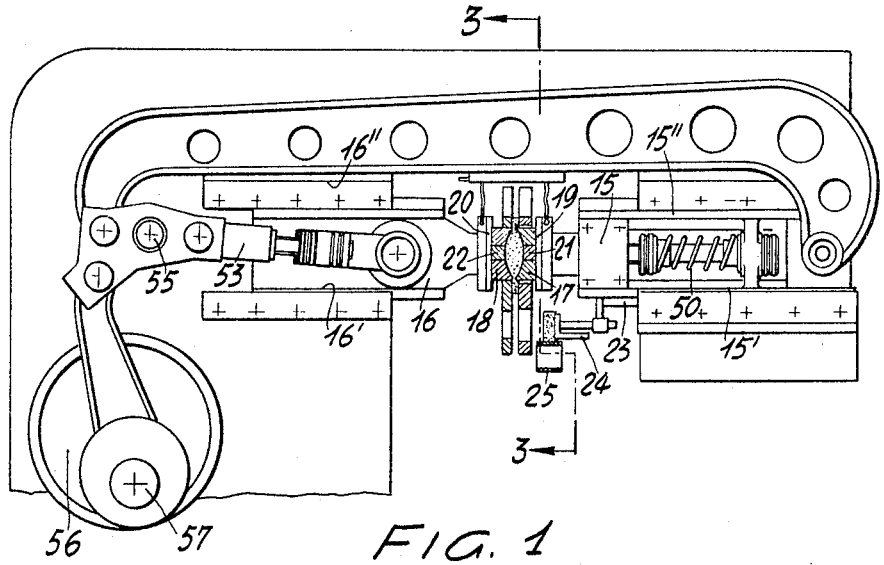
FIG. 1
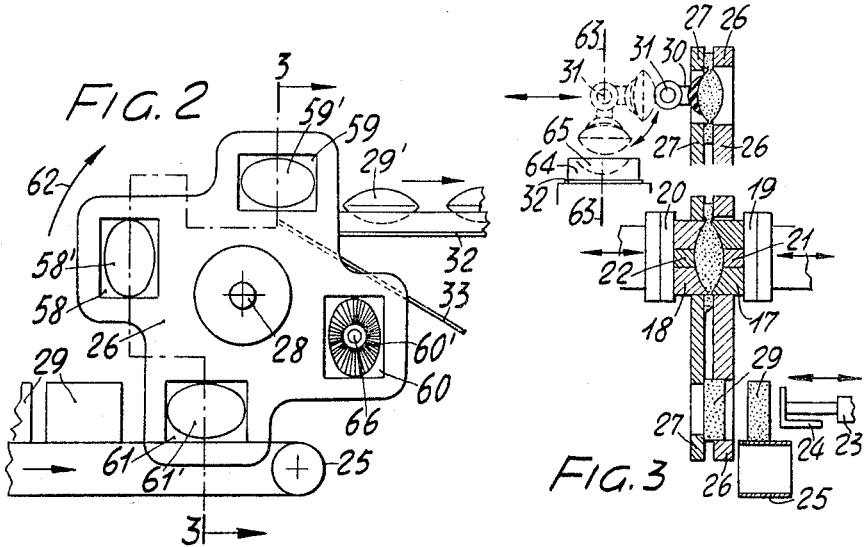
FIG. 2
FIG. 3

Sept. 13, 1966 C. MAZZONI 3,271,834
MACHINES FOR STAMPING TABLETS OF SUBSTANCES
HAVING A PASTY CONSISTENCY
Filed May 21, 1965 12 Sheets-Sheet 1
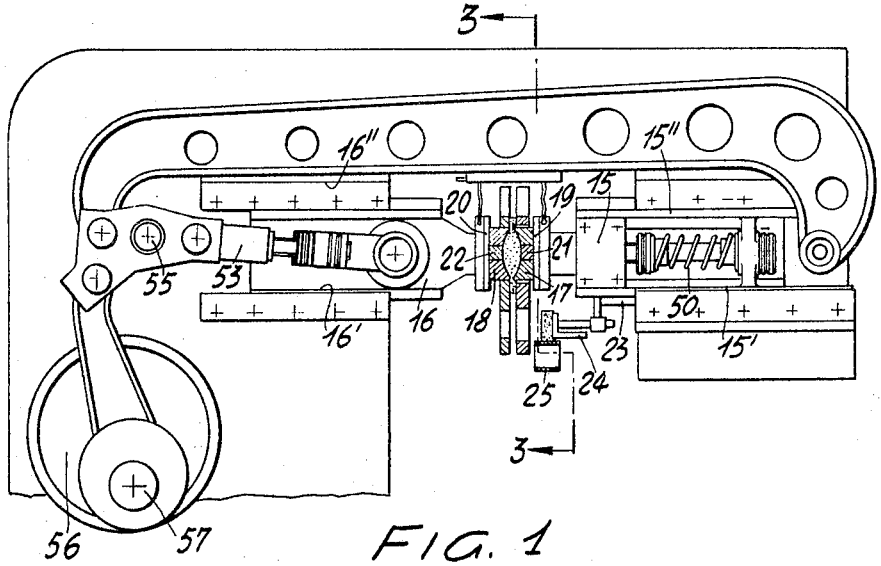
FIG. 1
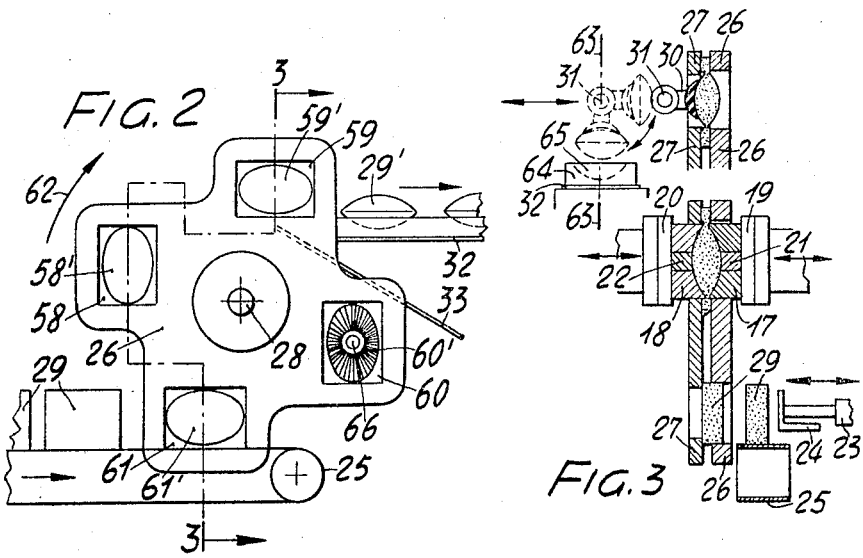
FIG. 2
FIG. 3

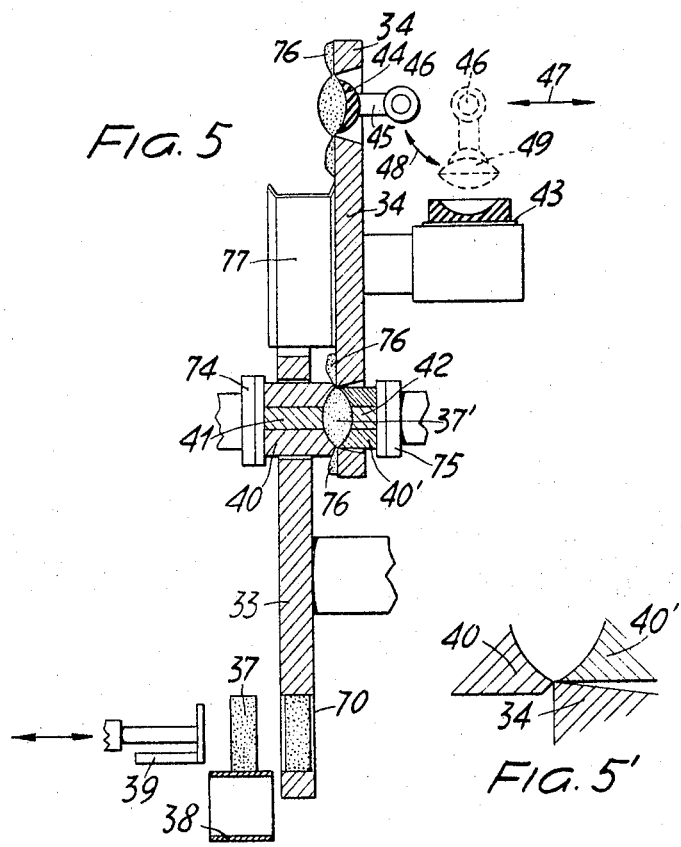
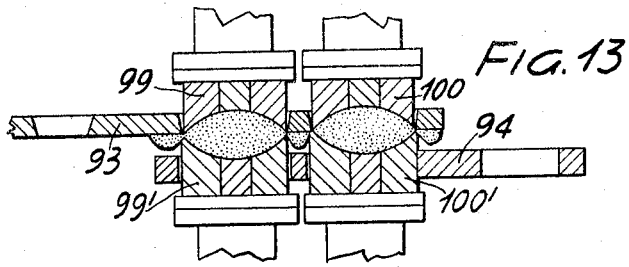

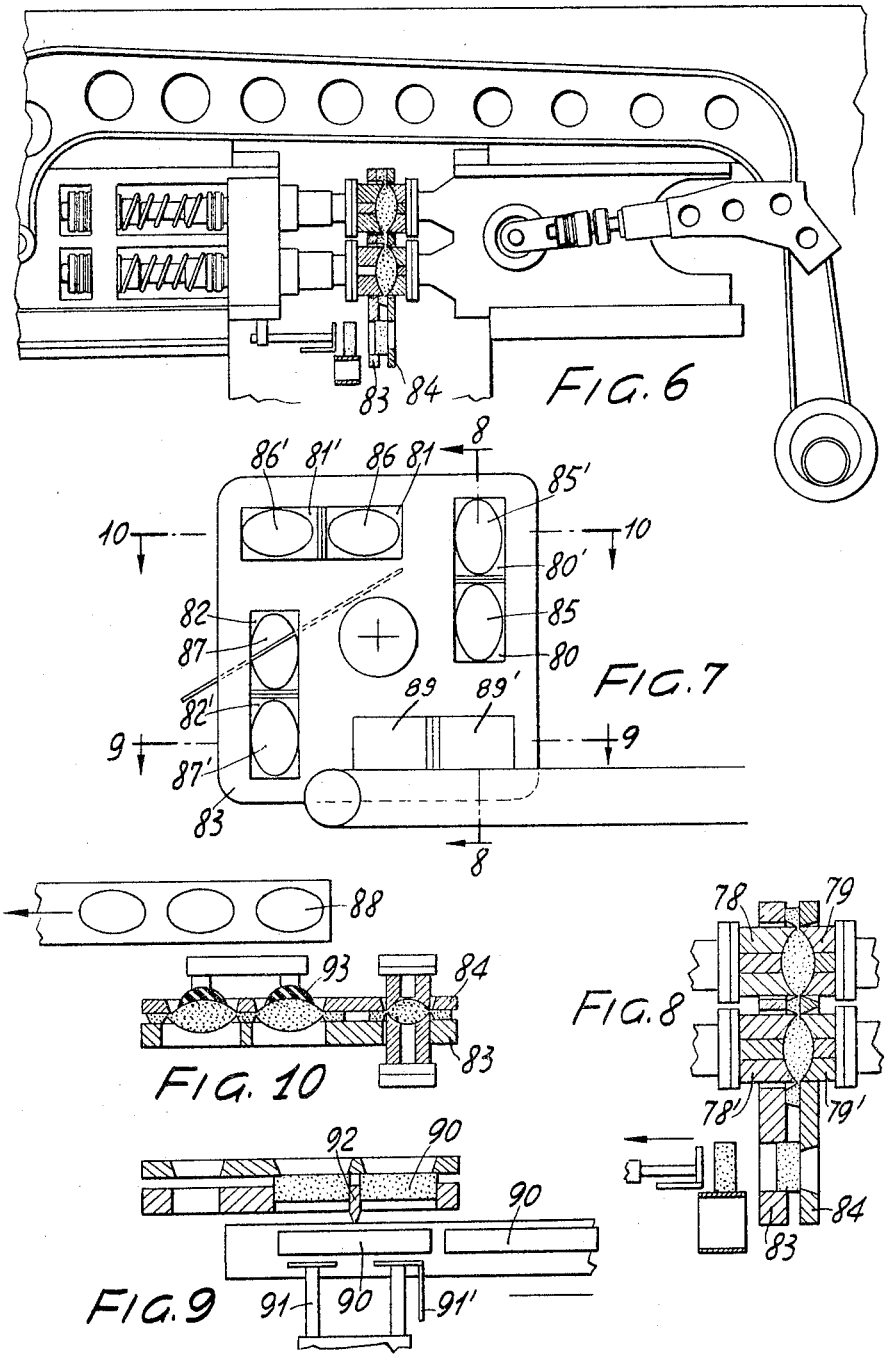

Sept. 13, 1966  C. MAZZONI  3,271,834
MACHINES FOR STAMPING TABLETS OF SUBSTANCES
HAVING A PASTY CONSISTENCY
Filed May 21, 1965  12 Sheets-Sheet 5

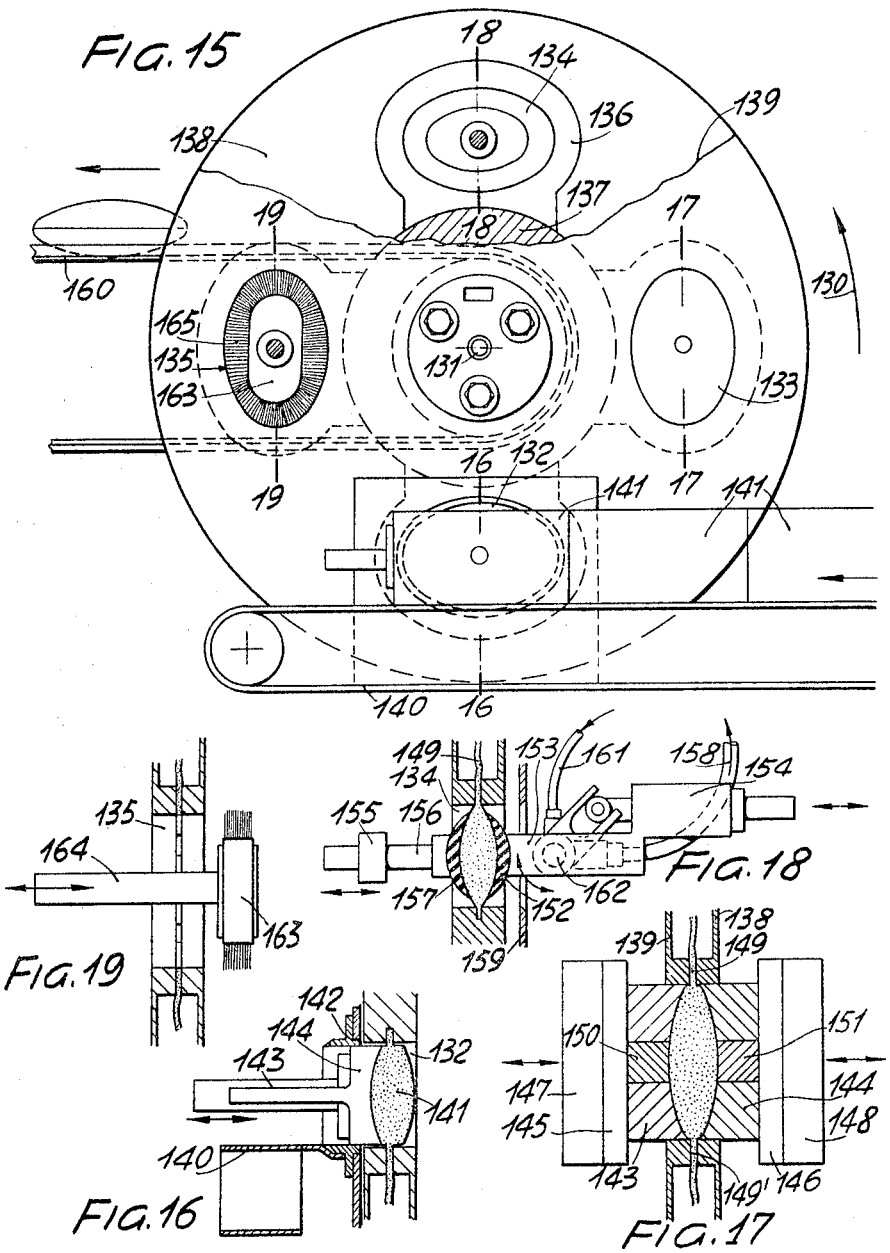

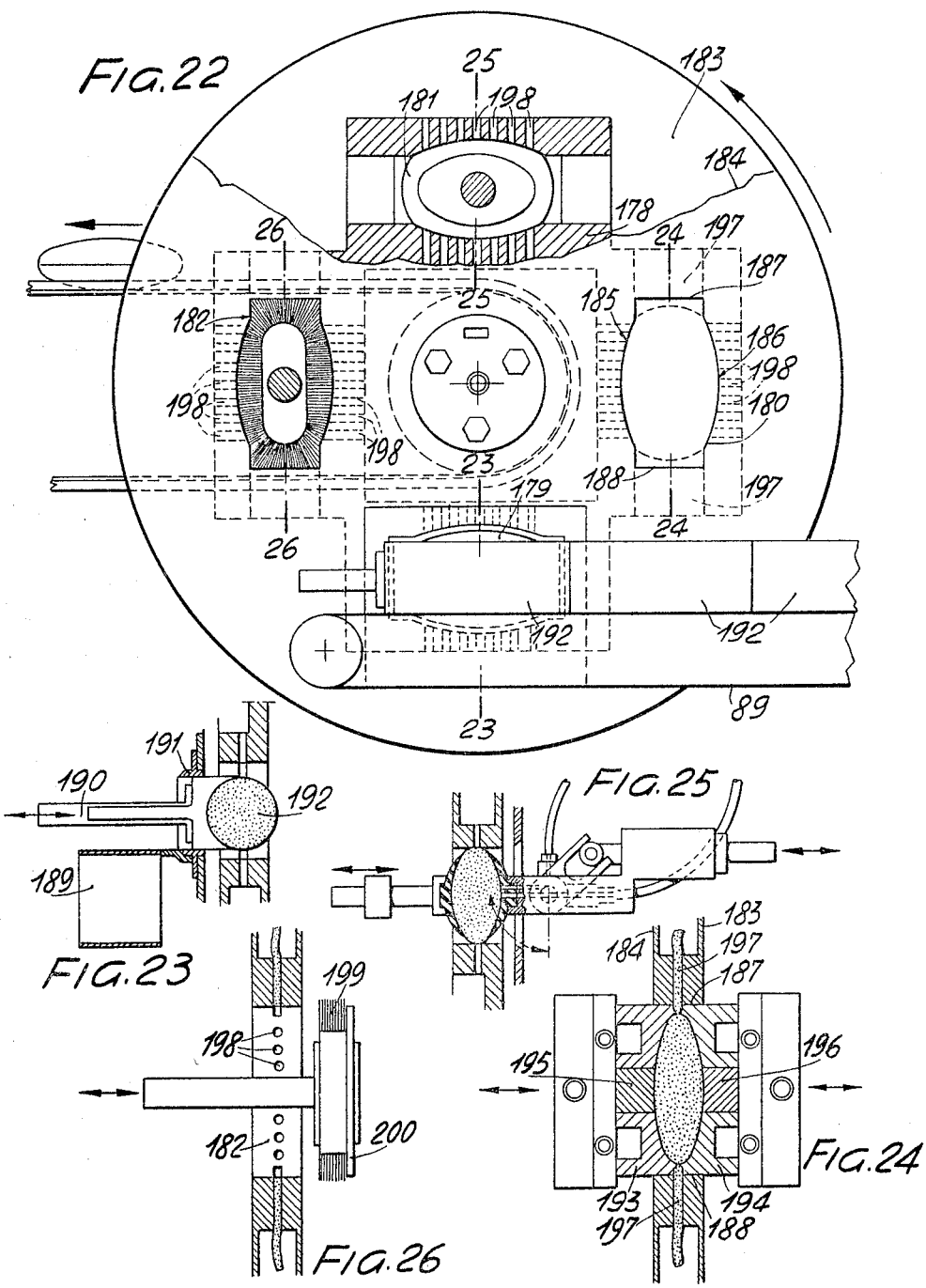

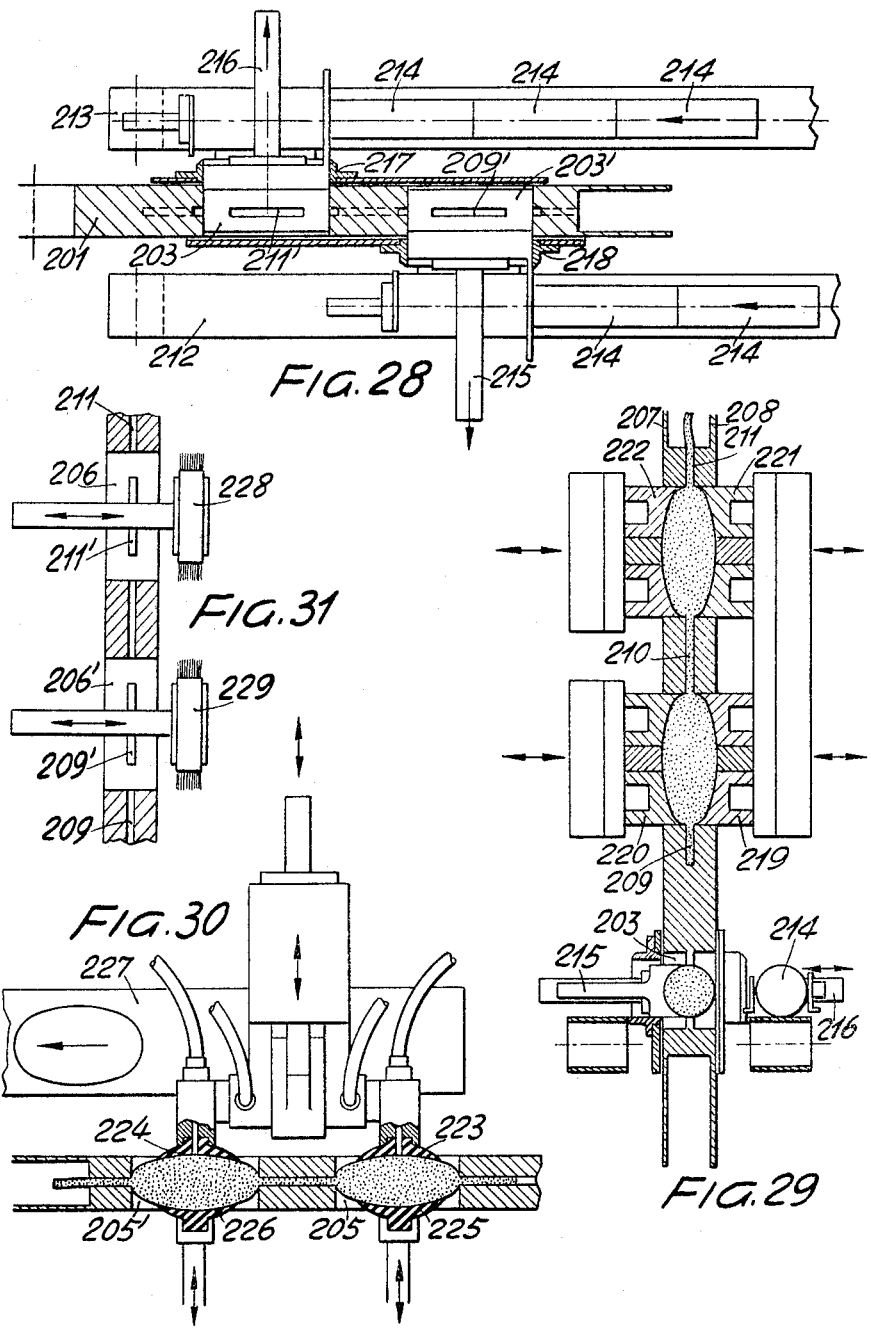

Sept. 13, 1966 C. MAZZONI 3,271,834
MACHINES FOR STAMPING TABLETS OF SUBSTANCES
HAVING A PASTY CONSISTENCY
Filed May 21, 1965 12 Sheets-Sheet 12

United States Patent Office 3,271,834
Patented Sept. 13, 1966

3,271,834
MACHINES FOR STAMPING TABLETS OF SUBSTANCES HAVING A PASTY CONSISTENCY
Carlo Mazzoni, 10/12 Viale Trentino,
Busto Arsizio, Varese, Italy
Filed May 21, 1965, Ser. No. 457,695
Claims priority, application Italy, May 23, 1964,
11,423/64; Oct. 19, 1964, 22,405/64
12 Claims. (Cl. 25—7)

Various types of machines are used for stamping tablets of substances having a pasty consistency, and particularly for soap stamping. Machines of a particular utility are those in which moulding or stamping operation occurs by means of two opposed dies operating by reciprocating motion and subsequently penetrating into a series of pockets in a release revolving member intended to sequentially carry out the following operations: receiving of the blank to be stamped; carrying said blank to a position adapted to undergo die action; containing of the blank during stamping operation and assuring the shape thereof on sides unaffected by dies, and finally carrying the stamped tablet to a position suitable to be unloaded on a discharge conveyor or other convenient means to this purpose.

Machines of this type have been disclosed, for instance, in German patent Series No. 501,873, granted July 9, 1930, in the name of R. A. Jones & Company Incorporated, at Covington, Kentucky (U.S.A.).

Such machines are adapted to stamp on both faces thereof soaps of a parallelepiped, elliptic, round shape, etc., having a peripheral flat band, even though this band is only a few millimeter thick.

It is an object of the present invention to provide an improved device capable of stamping on both faces, besides the above described types of soaps, also soaps of whatever shape (elliptic, spheric, lenticular, etc.), but practically having no contour surface, as said contour surfaces are coincident with the equatorial contact line of the two surface halves of the stamped soap tablet.

It is known that in order to stamp soap into shapes free of equatorial or side flat band, it is necessary that, prior to stamping, soap blanks be of a larger volume than stamped finished tablets and therefore the soap, exceeding volume enclosed between dies, has to be removed from dies themselves.

From this, necessity rises to allow exit of said surplus or scrap soap from dies, to separate it from stamped soap tablets, and to collect it in order to rework it again.

In the hitherto used machines for stamping soap into shapes without side band, and just according to the necessity of eliminating surplus material ejected from dies at the end of forward stroke thereof, no box is being used, allowing scrap soap ejected from dies to fall down by gravity, or removing it my means of trimmers. Absence of a die box involves necessity of a series of sequential operations, and namely: loading of blank to be stamped between dies, stamping, removal of scrap, withdrawal and removal of stamped tablet. Such operations, to be subsequently carried out at each operating cycle of the stamping machine, are restrictive for machine operating speed. The machine, comprising the present invention and utilizing a die box also for soaps having no flat side band, allows simultaneous execution of various operations: indeed, at each operating cycle of the machine, the following operations are simultaneously carried out: blank loading, blank stamping, tablet unloading and trimming, die pocket cleaning. Machine speed can be evidently maintained at a reasonable high level, a very high output being granted by simultaneity of various operations.

According to the present invention, position, shape and sizes of outlet channels in die box have been especially designed to let free passage to scrap soap ejected from die halves and simultaneously to cause adhesion between stamped soap and die box in order to retain soap in position during transfer thereof from stamping to unloading step. More precisely, invention comprises the combination of: a release revolving device or die box for soap tablet stamping, provided with means adapted to receive from stamped soap tablets the scrap soap extruded from dies through outlet channels provided for this purpose; means adapted to remove scrap soap eliminated from dies; and means to clean both pockets and sides of revolving die box from eventual soap remainders.

The accompanying drawing diagrammatically shows, by way of example, some embodiments of the device comprising the invention, and namely:

FIGURE 1 illustrates the main part of the single die unit stamping machine, to which the new revolving die box and respective dies are applied;

FIGURE 2 is a front view of the new revolving die box;

FIGURE 3 is a sectional view of the aforementioned revolving die box taken on line 3—3 of FIGURE 1;

FIGURE 5 is a broken-away vertical section of the die box taken on line 5—5 of FIGURE 4;

Figure 14:
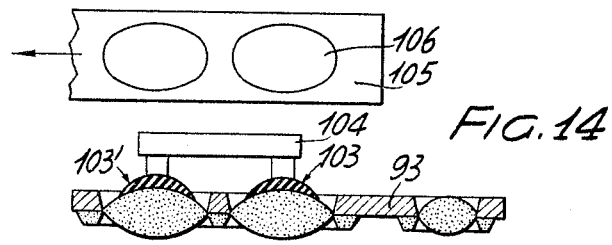
Figure 11:
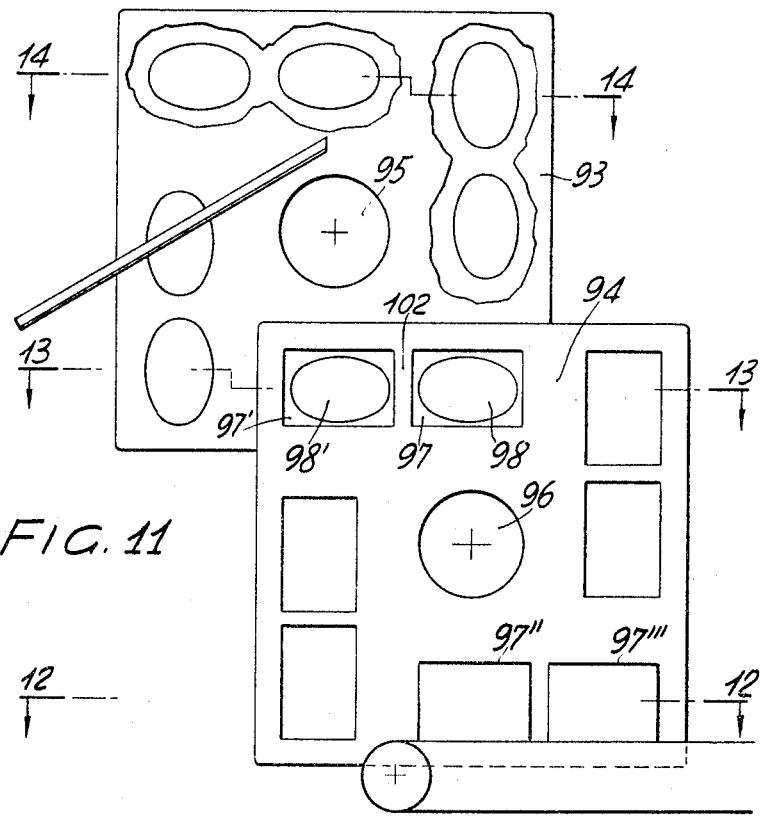
Figure 12:
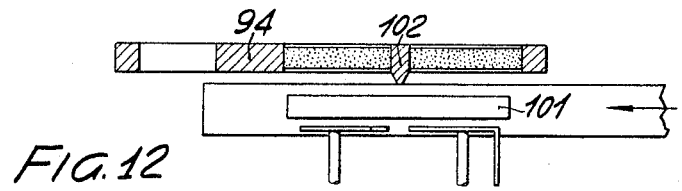
Figure 20:
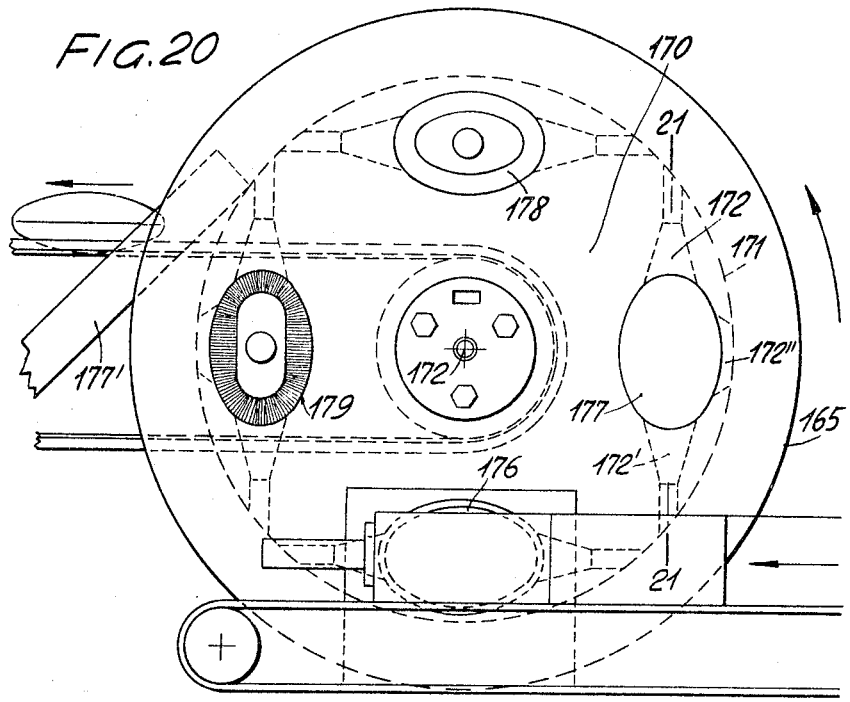
Figure 21:
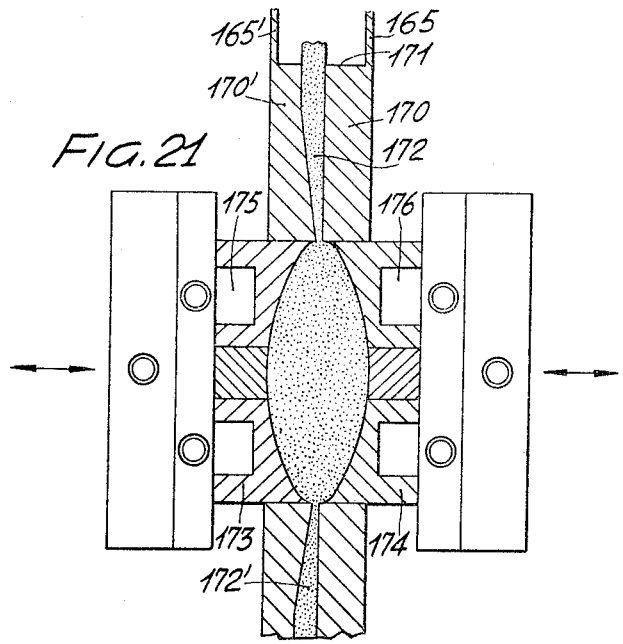
Figure 27:
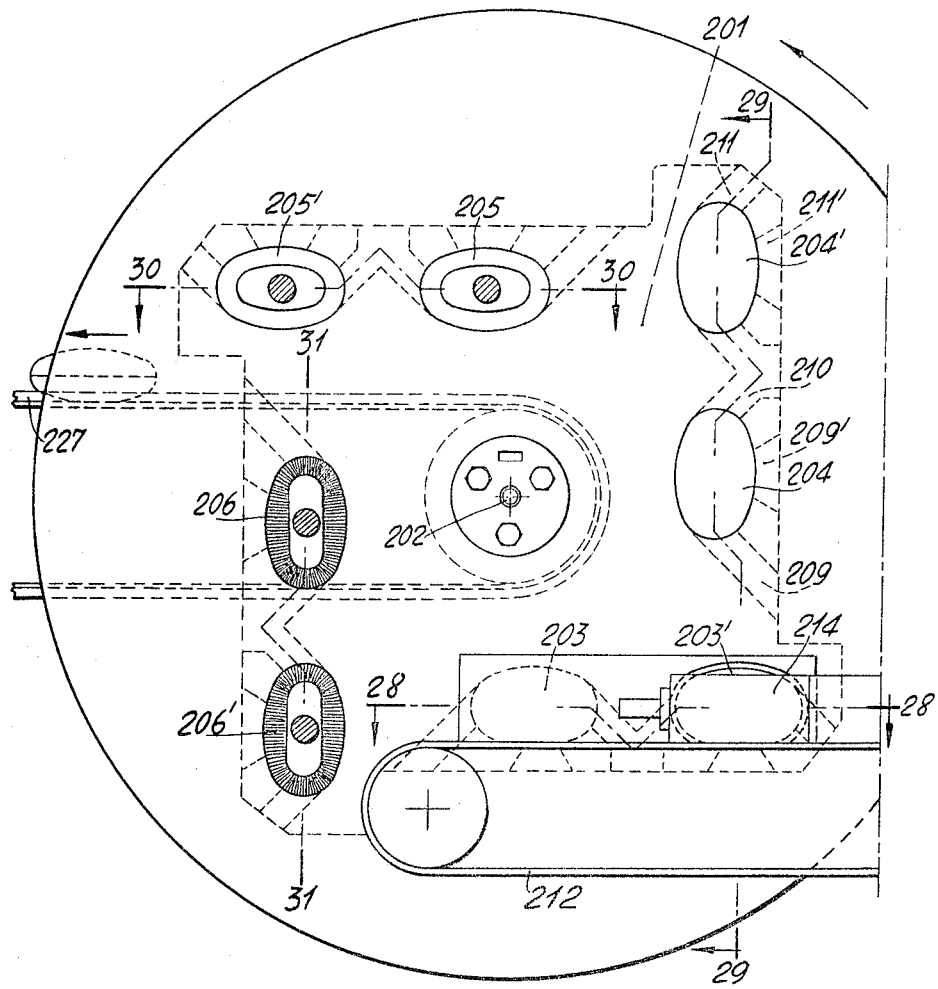
Figure 32:
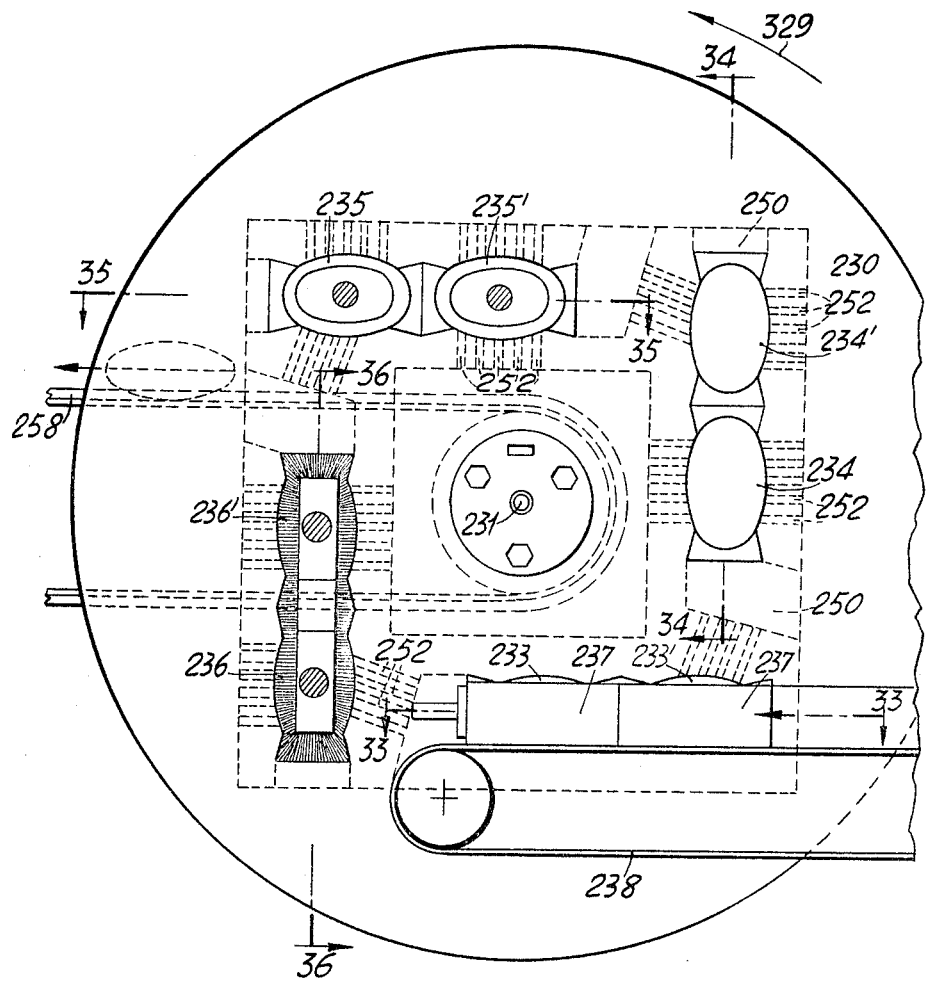
Figure 33:
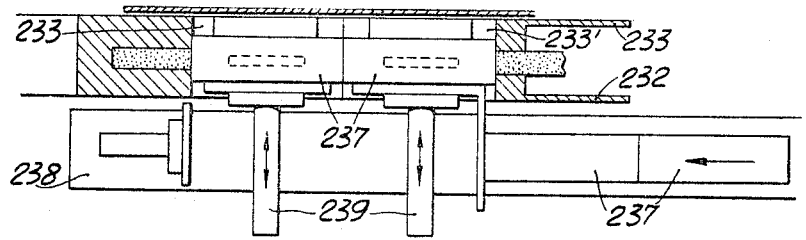
Figures 34, 36:
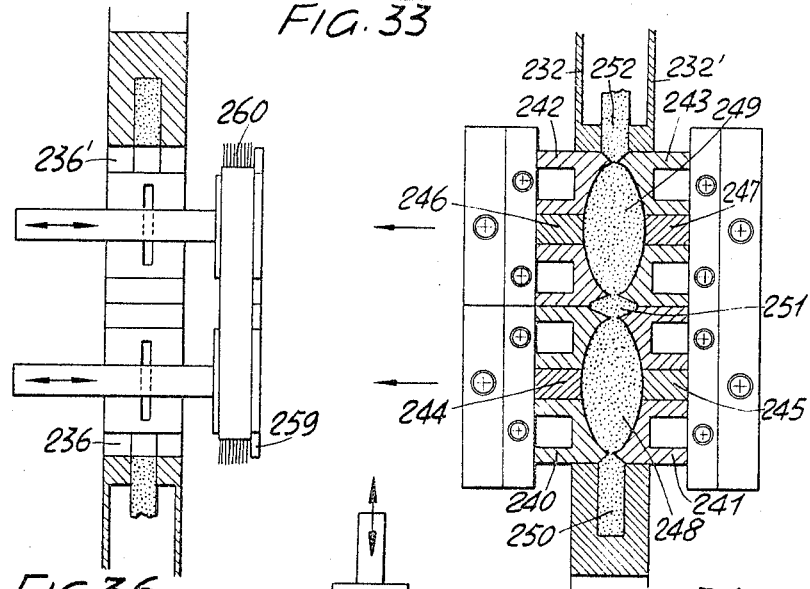
Figure 35:
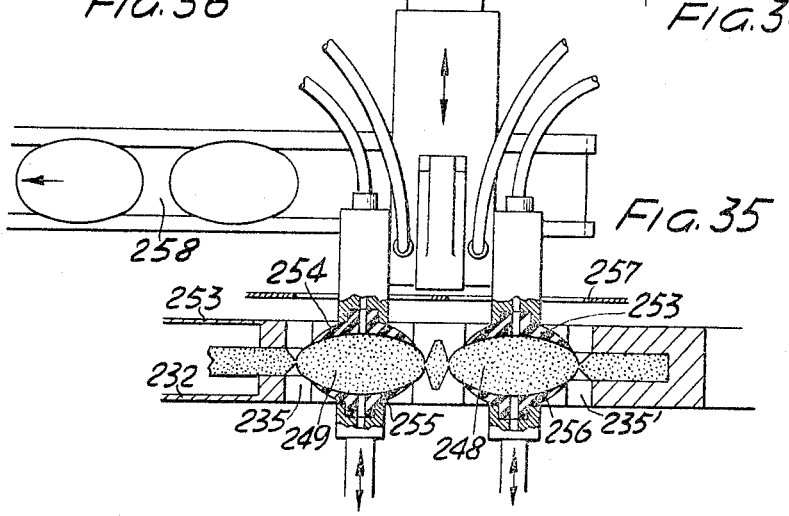

FIGURE 5' is a view of a detail;

FIGURE 6 shows the working portion of a stamping machine with two die units, partially in a vertical section;

FIGURE 7 is a front view of the revolving die box for the machine with two die units, such as the one shown in FIGURE 6;

FIGURE 8 is a vertical section of the die box shown in FIGURE 7, taken on line 8—8 of FIGURE 7;

FIGURE 9 is an horizontal section of the die box taken on line 9—9 of FIGURE 7;

FIGURE 10 is an horizontal section of the die box taken on line 10—10 of FIGURE 7;

FIGURE 11 shows a further arrangement of the revolving die box for a machine with two die units;

FIGURE 12 is a sectional view of the die box taken on line 12—12 of FIGURE 11;

FIGURE 13 is a sectional view of the die box taken on line 13—13 of FIGURE 11;

FIGURE 14 is a sectional view of the die box taken on line 14—14 of FIGURE 11;

FIGURE 15 is a partially sectional front view of a different revolving die box adapted for a machine having only one die halves unit;

FIGURE 16 is a vertical sectional view taken on line 16—16 of FIGURE 15 showing a pocket of the aforementioned die box in feeding position;

FIGURE 17 is a vertical sectional view taken on line 17—17 of FIGURE 15, showing a pocket of the aforementioned die box in stamping position;

FIGURE 18 is a vertical sectional view taken on line 18—18 of FIGURE 15, showing a pocket of the aforementioned die box in discharging position;

FIGURE 19 is a vertical sectional view taken on line 19—19 of FIGURE 15, showing a pocket of the aforementioned die box in cleaning position;

FIGURE 20 shows a further form of revolving die box in a front view, suitable for a machine having a single die halves unit;

FIGURE 21 is a vertical sectional view taken on line 21—21 of a die box pocket of FIGURE 20 in stamping position;

FIGURE 22 is a partially sectional front view of a further form of revolving die box, suitable for a machine having a single dies unit;

FIGURE 23 is a vertical section taken on line 23—23 of a die box pocket of FIGURE 22 in feeding position;

FIGURE 24 is a vertical section taken on line 24—24 of a die box pocket of FIGURE 22 in stamping position;

FIGURE 25 is a vertical section taken on line 25—25 of a die box pocket of FIGURE 22 in discharging position;

FIGURE 26 is a vertical section taken on line 26—26 of a die box pocket of FIGURE 22 in cleaning position;

FIGURE 27 is a front view of a new revolving box, suitable for a machine having double dies units;

FIGURE 28 is a section taken on line 28—28 of the die box shown in FIGURE 27;

FIGURE 29 is a section taken on line 29—29 of the die box shown in FIGURE 27;

FIGURE 30 is a section taken on line 30—30 of the die box shown in FIGURE 27;

FIGURE 31 is a section taken on line 31—31 of the die box shown in FIGURE 27;

FIGURE 32 is a front view of a further embodiment of a revolving die box, suitable for a machine having two die sets;

FIGURE 33 is a section taken on line 33—33 of the die box shown in FIGURE 32;

FIGURE 34 is a section taken on line 34—34 of the die box shown in FIGURE 32;

FIGURE 35 is a section taken on line 35—35 of the die box shown in FIGURE 32; and FIGURE 36 is a section taken on line 36—36 of the die box shown in FIGURE 32.

In FIGURES 1–3 there is shown a portion of the stamping machine and particularly of the device comprising the die box, two die halves 17 and 18 mounted, respectively, on plates 19 and 20, said plates being on turn integral with two slides 15 and 16, such slides being slidable on pairs of sliding guides 15′–15″ and 16′–16″ and under action of a resilient guided member 50.

Slides 15 and 16 have an horizontal reciprocating motion caused by a known linkage system, such as the one illustrated in FIGURE 1. The two dies 17 and 18 subsequently pass through windows 58, 59, 60 and 61 in a pair of distributing plates pivoted at 28 and having a profile shaped so as to efficiently co-operate with the dies.

In operation, slides 15 and 16 effect an horizontal reciprocating motion moving the two dies 17 and 18 near and away from each other, said dies being secured to respective slides 15 and 16 by die backing plates 19 and 20.

Within the two dies 17 and 18, ejectors 21 and 22, driven by compressed air in accordance with the principle disclosed in applicant's further patents, are accommodated.

Adjacent slide 15 there is provided a second slide 23, also having an horizontal reciprocating motion, to which the introducing pusher 24 is secured, said pusher being disposed in correspondence with the belt conveyor 25 supplying blanks 29 to be stamped, such as rectangular cross-section parallelepiped.

The stamping device is comprised of two separate plates or die boxes 26 and 27, keyed on the same central axis 28, which releasably revolves through a Geneva cross, or other suitable kinematic motion, in synchronization with movement of the two dies 17 and 18. The four pockets 58, 59, 60 and 61 of the rotating die box 26 are exactly shaped to soap blanks 29 prior to stamping and are distributed to be carried at the proper time in front of the supply pusher 23–24 and then in front of dies 17 and 18. Rotating die box 27 carries four pockets 58′, 59′, 60′ and 61′ having the centers thereof coincident with the centers of the four pockets 58, 59, 60 and 61, but having the shape thereof corresponding to the precise contour of the stamped tablets 29′, which may be oval, for example.

The two rotating boxes 26 and 27 are spaced from each other and their distance can be adjusted by any known system. Said distance between the two boxes 26 and 27 is adjusted as a function of the stamped soap shape as well as of the volume of scrap soap ejected from the two dies 17 and 18 in the stamping step, said volume besides a function of soap tablet sizes naturally varying as a function of the difference between soap blank volume prior to stamping and stamped soap tablet volume.

Machine operating cycle is as follows: Introducing pusher 24 pushes soap 29 to be stamped from supply conveyor belt 25 into lower pocket 61 of revolving die box 26.

Then, pair of boxes 26 and 27 effect a 90° rotation in direction of arrow 62 carrying soap to be stamped to position 58 (FIGURE 2), that is, in correspondence with the two dies 17 and 18 (FIGURE 3), which dies during rotation of pair of die boxes 26 and 27 are moved away from sides of the same die box as a consequence of the reciprocating motion of slides 15 and 16.

90° rotation of boxes 26 and 27 being completed, the two dies 17 and 18 move near each other, so that die 17 enters pocket 58 of box 26, whereas die 18 enters pocket of box 27.

During said forward motion, dies 17 and 18 compress soap to be stamped until edges thereof are nearly contacting with one another. Point of maximum die approaching coincides, but is not symmetric with free zone determined by inner sides of die boxes 26 and 27. More exactly, die edge 18 should overpass for a very short distance the inner side of die box 27. Thus, pocket of die box 27 acts as a trimmer, whereas pocket of thicker die box 26 acts as a supply container.

During die forward movement, scrap soap ejected from dies is forced into the pocket between the inner sides of die boxes 26 and 27.

While dies 17 and 18 start their mutual backward stroke, the respective ejectors 21 and 22 become operative in order to assure that no stamped soap remain adherent to dies themselves.

As soon as dies 17 and 18 have moved away from pockets of die boxes 26 and 27, the pair of die boxes 26 and 27 effect a further 90° rotation, carrying stamped soap to position 59–59′ corresponding to discharge.

At this point, a sucker 30 (FIGURE 3), connected through an articulated arm 31 with a slide effecting an horizontal reciprocating movement, approaches stamped soap tablet and owing to vacuum provided by suitable means adheres to stamped soap surface and causes it to pass through pocket of box 27, the edge of which exactly corresponds to stamped soap contour. In such manner, scrap soap, ejected from dies 17 and 18, is cut in precise correspondence with stamped soap tablet contour.

In its removing stroke from die box 27, sucker 30 carries stamped soap tablet on discharge conveyor 32.

When in correspondence with median axis 63 of said conveyor 32, sucker 30 effects a downward rotation of 90° by means of articulation 31 and then, connection with vacuum pump being disconnected and connection with a compressed air pipe being established by means of a known type distributor, said sucker separates from stamped bar.

For convenience of transport or connection with machines that subsequently have to receive stamped soap, discharge conveyor 32 may be covered with soft and spongy material 64, having pockets 65 into which stamped soap is arranged.

During subsequent 90° rotation, pair of die boxes 26 and 27 encounter a sloping scraper 33, inserted in the free space defined by inner sides of die boxes 26 and 27, so as to remove scrap soap ejected from dies 17 and 18 and restrained between the two die boxes 26 and 27.

In the new position occupied by die boxes 26 and 27, after stamped soap discharge and prior to initiating a new cycle, a cleaning brush 66 is operated (FIGURE 4), said brush connected by way of example with slide 23, passing through die box pockets and removing any trace of soap. Said cleaning action of brush 66 may be integrated with suitable compressed air jets, containing or not nebulized substances adapted to clean and/or to lubricate pockets of the die boxes 26 and 27 forming an integrant part of the stamping device.

In another embodiment of the device (FIGURES 2 and 3), the revolving box 26 may have pockets 58′, 59′, 60′ and 61′ of an identical shape as those of the revolving die box 27, and between the feeding conveyor 25 and the side die box 26 there may be interposed a soap trimmer, so as to introduce already pre-shaped soap tablets into the pockets of die box 26.

In a further embodiment modification (FIGURES 4 and 5) the two revolving die boxes 26 and 27, instead of being keyed on the same axis 28, can be completely separated from each other and secured to two different axes, parallel to each other and disposed on an horizontal, vertical or inclined plane.

Each of the two separate die boxes 26 and 27, that can be referred to as the feeding die box and the discharging die box, may have two, three or four through pockets and be so arranged that two pockets of the two die boxes have coincident axes in stamping position.

Figure 4:
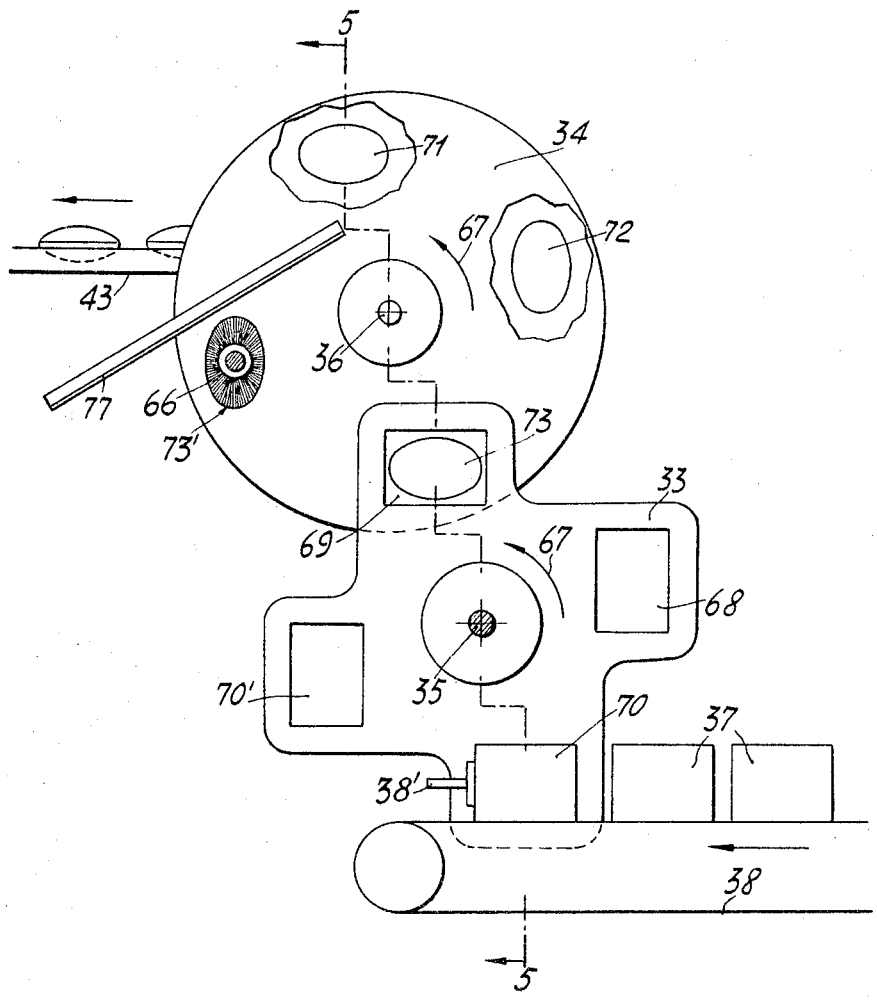
FIGURE 4 shows a further arrangement of the die box in a different scale from the one used in FIGURE 2.

In FIGURES 4 and 5 there is shown the example of a solution with two revolving die boxes having four holes each.

Revolving die box 33 is the supplying die box, whereas revolving die box 34 is the discharging die box. Said die boxes are respectively keyed on axes 35 and 36, parallel to each other and disposed on a plane which is slightly displaced from vertical. The two die boxes can revolve in the same direction, as shown by arrows 67 of FIGURE 4; or in a direction opposite to each other.

Even in this case, the through pockets 68, 69, 70 and 70′ of the revolving die box 33 may have the contour shape of soap piece 37 from feeding conveyor 38; or may have the same shape of pockets 71, 72, 73 and 73′ of the revolving die box 34 if between pockets of the revolving die box 33 and feeding conveyor 38 there is interposed a trimming device.

In said embodiment modification the working cycle is as follows:

Soap 37 gets in front of lower pocket of the die box 33 with a position defined by detent 38′.

Pusher 39 pushes soap blank into pocket 70 and then the revolving die box 33 effects a 90° rotation if the die box has four pockets, or a 120° rotation if the die box has three pockets, or a 180° rotation if the die box has two pockets. In any case, after one or more release rotations, the pocket previously loaded with soap to be stamped is in the position in which it faces the corresponding pocket of the revolving die box 34.

Such a position being reached, dies 40 and 40′, driven by respective slides 74 and 75, approach sides of die boxes 33 and 34, enter the respective faced pockets and compress soap 37′ forming it into the desired shape. Stroke of die 40 is greater than stroke of die 40′, as it has to pass through the entire width of the die box 33 and move near the side of die box 34. Stroke of die 40′ has to pass only through width of die box 34 and has to be adjusted so as to bring edge of die 40′ only in correspondence with the inner side of the revolving die box 34.

During forward stroke of the two dies 40 and 40′, scrap soap is ejected from dies and considering the shape which has been selected for the edge of die 40 (FIGURE 5′) it is caused to adhere to the inner side of the die box 34.

Stamping operation being completed, ejectors 41 and 42 contained in dies 40 and 40′ are operated in order to assure that stamped soap do not adhere to dies themselves during backward stroke thereof.

Dies 40 and 40′ being removed, die box 34 effects a rotation identical to rotation of die box 33 and brings stamped soap in correspondence with the discharge conveyor belt 43. In said position, stamped soap is caught by sucker 44 carried by arm 45, articulated at 46 in order to effect a translating movement 47 and angular movement 48 to deposit stamped soap 49 on discharge conveyor 43. During discharging operation scrap soap 76 is cut as already disclosed. Scrap soap is eliminated by a scraper 77 as in the first example and by means of a brush 66 cleaning operations are accomplished also in the same manner.

In FIGURES 6–10 there is illustrated a soap press having two pairs of superimposed dies 78–79 and 78′–79′, alternatively moving through pair provided through pockets 80—80, 81–81′ and 82–82′ on box 83, while box 84 has pockets 85–85′, 86–86′ and 87–87′ having the shape of the formed soap tablet 88. Loading of soap blanks to be shaped into dies may take place by advancing blanks 89–89′ two by two, as shown in FIGURE 7, by advancing a single bar 90 of a multiple length (FIGURE 9), which during loading step into pair of box pockets is forced by pushers 91–91′ against trimmer 92 of pairs of box pockets when they reach the lower loading position.

Instead, when blanks reach position 80–80′, 85–85′, soap is subjected to die operation and shaped. Finally in the upper position 81–81′, 86–86′ unloading is carried out by means of sucker 93 (FIGURE 10). For the remainder, machine of FIGURE 6 operates exactly as the one shown in FIGURE 1.

In FIGURES 11–14 there is shown a further modification of the double die stamping device, having vertical boxes 93 and 94 rotable about two horizontal axes 95 and 96, which are not coincident, but are displaced and parallel, so that stamping position is realized, where overlap of pockets 97–97′ in plate 94 and of pockets 98–98′ in plate 93 occurs. The two pairs of dies 99–99′ and 100–100′ horizontally move by reciprocating motion. Supply can be carried out with a multiple length bar, which is cut by trimmer 102 between the two pockets 97″ and 97‴ of box 94. Extraction of finished and shaped soap tablets is effected by suckers 103–103′ rockingly mounted on horizontal spindle 104, about which they effect a 90° angular displacement in order to support stamped tablets 106 on the conveyor belt 105. As for the rest, the moulding machine operates as described in connection with the embodiment of FIGURES 8 and 4.

In FIGURE 15 there is shown a die box revolving about axis 131 and having four pockets 132, 133, 134 and 135, the inner contour of which corresponds to the stamped soap contour. Each pocket is surrounded by a frame 136 capable of imitating the inner contour of the pocket, or may be of whatever other suitable shape.

Centers of said pockets are displaced from one another for 90 degrees, whilst axes thereof are coincident with vertical and horizontal main axes of the box.

Contour frames of each pocket are connected to the central box core 137, the axis of which corresponds with rotation axis 131.

Each outer side of the box is in the form of a disk 138 or 139, having an outer diameter exceeding the sizes of the frame surrounding the four pockets 132, 133, 134 and 135 and having the axis 131 as the center thereof.

In correspondence with the middle of the box width there is a slot or channel 149–149′ thoroughly cutting across the pocket frame width to reach central core 137.

Cross-section of said slot or channel port is determined on the ground of the shape and features of the soap to be stamped: it may be fixed or made adjustable by known systems. The channel may also have a constant or variable cross-section both along each pocket periphery and along frame section surrounding each pocket.

Since said channel 149–149′ thoroughly cuts the pocket frames into two parts, a portion of said pockets can be carried out separated from the central core and bound to the respective frame half by screws having interposed spacers, which serve to determine channel port. This example of embodiment allows a ready execution of any section shaped channels on machine tools.

Belt conveyor 140 supplies soap blanks 141 to be stamped in front of pocket 132 (FIGURES 15 and 16). Said soap blanks may have sizes thereof inferior than revolving die box pocket sizes, and in such a case they are directly supplied through a suitable pusher 143 from the supply conveyor to the corresponding die box pocket and placed at a centering position relative to the die box width. Soap blanks may also have larger sizes with respect to the sizes of the revolving die box pockets, and in such a case there is applied in front of die box pocket 132 a trimmer 142, so that soap, pushed by pusher 143 ending with an outline 144 exactly imitating soap side shape 141, is cut by the trimmer 142 with a contour identical to that of the die box pockets.

After feeding, the die box effects a 90° rotation in direction of arrow 130, so that pocket 132 assumes the position of pocket 133.

In said position stamping operation takes place, i.e., the two die halves 143 and 144 (FIGURE 17), having the contour thereof in exact coincidence with the stamped soap contour and being secured to the backing plates 145 and 146 in turn anchored to horizontal reciprocating slides 147 and 148, precisely penetrate into die box pocket 133 progressively compressing the soap blank, which has been previously loaded into said pocket.

During said progressive compression, and being the soap volume supplied to the die box pocket larger than die enclosed volume, a soap portion is caused to be expelled through channels 149–149' transversely cutting each pocket frame.

Said channel serves to a dual end: that of allowing scrap soap exit and that of providing for an anchorage between stamped soap and die box pocket, so as to facilitate soap separation from the surface of dies 143 and 144 and simultaneously to hold the stamped soap in the pocket during the following 90° rotation of the die box.

In order to facilitate stamped soap separation from dies 143 and 144, ejectors 150 and 151 are provided, said ejectors being mechanically, pneumatically or air jet operated, according to the principles disclosed in applicant's further patents.

The soap portion, pushed out of the above slot 149–149', is retained between the disks 138 and 139 so as not to fall down again between the dies in the subsequent stamping stroke, and falls then by gravity or by a convenient suction system into a collecting hopper, not shown, situated beneath the revolving die box.

In the next 90° rotation of the die box, the stamped soap is brought to the discharge position corresponding to the position of pocket 134.

In said position, shown in FIGURE 18, the stamped soap is picked up from pocket 134 by means of a sucker 152 connected with an articulated arm 153 to an horizontal reciprocating slide 154.

In order to assure that stamped soap be always in a right position in front of sucker 152 so that it can perfectly adhere to the same, on the opposite side to slide 154 there is arranged a further slide 155 effecting an horizontal reciprocating motion in a direction opposite to that of slide 154. Slide 155 carries an arm 156 terminating with a cushion 157, in rubber or other material, which perfectly fits to the stamped soap shape.

Therefore, in the discharge step, the two slides 154 and 155 progressively approach the soap which is accommodated in pocket 134, gently closing it between cushion 157 and sucker 152. Thus, in the subsequent removing step, whilst cushion 157 moves away, sucker 152, in which a vacuum has been provided for through the pipe 158 (connected to a known vacuum system), draws the stamped soap separating it from scrap soap enclosed within the channel 149 preset in the die box pocket frame.

Since contour of pocket 134 exactly corresponds to the stamped soap contour, scrap soap is perfectly cut according to the contour itself.

In particular circumstances, it may be necessary to apply a trimmer 159 of stiff or resilient material, disposed on the die box pocket side, in order to trim the stamped soap contour.

In its horizontal backward stroke, soap adhering to sucker 152 encounters the trimmer 159 intended to trim the contour line of soap itself. Thus, when the sucker has arrived on the discharge conveyor belt 160, the rocking arm 153 effects a downward 90° rotation, so that stamped soap is carried to a position parallel to the discharge conveyor belt surface. In order to assure a rapid soap separation from sucker 152, compressed air is injected into sucker itself through the pipe 161 by a rotating distributor enclosed within the joint or articulation 162.

In a further variation, the two slides 154 and 155, respectively carrying the cushion 157 and sucker 152, after adhering to the stamped soap, both accompany it out of pocket 134 and beyond the trimmer of the trimming device 159, in order to keep soap in the right position.

Subsequently, slide 155 effects its backward stroke, whilst slide 154 carries on its stroke towards the discharge conveyor belt 160 with a subsequent sucker rotation as above stated.

In the next 90° rotation, pocket 134, released from the stamped soap, assumes the position of pocket 135. In said position, a brush 163, connected to an horizontal reciprocating motion slide 164, passes through the box pocket 134, both in its forward stroke and in its backward stroke, removing any soap particles.

In FIGURE 20 there is shown a further embodiment of a revolving die box adapted, by way of example, to a machine having only one pair of die halves.

In said embodiment, the revolving die box is formed of a cylindrical core 170, within which there are four pockets 176, 177, 178 and 179, disposed at 90° to one another, and having its axis coincident with the rotation axis 172.

On the outer sides said core carries the disks 165–165', the centers of which are coincident with the axis 172. Thus, as seen in section, the revolving die box is in the form of a spool.

For each pocket, and in correspondence with the middle of the die box width, there are channels 172–172'–172" having the purpose of collecting and retaining scrap soap from the die halves.

The position of said channels 172–172'–172" with respect to the pocket contour of the revolving die box, their outline and shape, and the section thereof are determined on the ground of the shape and features of the soap to be stamped.

For an easy manufacture of said channels, the revolving die box may be comprised of two die box halves 170–170', joined together according to the median plane of the overall width by means of known suitable systems, not shown (such as screws, bolts and the like). Thus, the execution of the above channels is carried out on machine tools in an easier way.

Feeding, stamping, discharge and cleaning steps are alike those previously disclosed.

In FIGURE 21 there is shown a sectional view of the die box pocket 147, corresponding to the stamping position. Dies 173–174 are provided with ducts 175–176 for the cooling fluid passage having the purpose of facilitating, in accordance with known principles, soap separation from dies.

In order to remove soap ejected through the outlet channels 172–172'–172" of scrap soap, there is arranged a sliding scraper 177', tangentially adhering to the outer cylindrical surface 171 of the revolving die box core 170.

In FIGURES 22–26 there is shown a further embodiment variation of the revolving die box and of the die halves unit, being by way of example referred to a machine having one pair of die halves.

In said embodiment, the revolving die box is comprised of a core 178 surrounding the four pockets 179, 180, 181 and 182. On the two outer sides of the die box, flanges or disks 183–184 described in the preceding embodiments are always provided for, said elements having the purpose of retaining scrap soap ejected from die halves in order to convey it to discharge.

It is here necessary to remind that in the previously described embodiments (FIGURES 15–21), the inner contour surface of the die box pockets is quite identical to the contour surface of the stamped soaps, and that the die halves, accurately penetrating into the pockets, also have a contour surface identical to that of the stamped soaps.

In the present embodiment instead (FIGURE 22), the inner contour surface of the pocket is entirely or only partially larger than the contour surface of the stamped soaps.

In the drawing of FIGURE 22, there is shown by way of example a pocket contour corresponding on the two largest sides 185–186 to the surface of the stamped soap, whereas on the two smallest sides 187–188 the pocket surface does not correspond to the stamped soap contour, but makes up a much larger pocket. Outlet channels 197 allow discharge of scrap soap ejected from dies.

In FIGURE 23 there is shown the supply step, in which there are the supply conveyor 189, the introducing arm 190 and the trimmer 191 that, as stated, is not strictly necessary. By way of example, soaps 192 to be stamped are shown in a cylindrical shape.

In FIGURE 24 there is shown the stamping step, in which there are die halves 193–194 with ejectors 195–196. As seen in said figure, the outer surface of the dies accurately enters the die box pockets, but not imitating the soap contour in correspondence with the surfaces 187 and 188. Therefore, in these zones the die halves edge is shaped so as to have an inner edge corresponding to the contour line of the stamped soap and an outer surface perfectly fitting to the correspondent inner surface of the die box pocket. Between said surfaces there are provided outlet channels 197 and pockets 198 corresponding to the contact surfaces of the die halves in order to assure exit of scrap soap with respect to volume enclosed by die halves.

Thus, the die halves progressively approach soap to be stamped subjecting it progressively to the stamping action and a free exit is allowed from dies of scrap soap ejected through channels 197, which may have a very wide section.

Said embodiment may be adopted for particularly shaped soaps requiring a remarkable difference between blank to be stamped and volume of finished bar, thus having a considerable amount of scrap soap to be ejected out of the die halves.

In addition, this solution allows to adopt less sharp edges for the manufacture of the die halves edge.

For the practice of said outlet channels 197–198 of scrap soap, the die box can be formed of two box halves joined to each other according to the median plane corresponding to the plane in which said channels are and coincident with the equatorial line of the stamped soap contour.

Discharge and cleaning steps, shown in FIGURES 25 and 26, are identical to those previously described, the only variant being that brush 199 is preceded by a suitable plunger 200, which perfectly imitates contour of pocket 182 so as to subject it to a scraping action integrating the cleaning operation carried out by the brush. It is evident that the above described solutions relating to the embodiment of revolving die boxes suitable for machines having only one series of die halves can be adopted with slight variations for machines having two, three or more pairs of die halves.

In FIGURES 27, 28 and 29 there is shown by way of a mere indicative example a solution suitable for the embodiment of a revolving die box to be applied to a machine having two pairs of die halves. The revolving die box is composed of a core 201, revolving about axis 202, within which pairs of pockets 203–203', 204–204', 205–205' and 206–206' are realized. Said pairs of pockets can be arranged being displaced with respect to the vertical and horizontal main axes of the revolving die box, or can be arranged in a centering condition relative to said axes.

As in the preceding embodiments, said central core carries on sides thereof two disks 207–208 having the purpose of collecting scrap soap ejected from the channels in the core 201.

Said pockets have a contour exactly imitating the stamped soap contour.

For each of said pockets, channels 209, 209', 210, 211, 211' (FIGURES 27 and 29) are preset, the arrangement of which with respect to the pocket contour and along with shape, size and section thereof may be fitted to the particular shape of soap to be stamped and to features thereof.

Soap tablets 214 on supply conveyors 212 and 213, arranged on both sides of the revolving die box 201, are fed into pockets 203–203' by means of pushers 215–216 connected with suitable horizontal reciprocating motion slides. In the example illustrated, soaps prior to the stamping have a cylindrical shape and are passed through suitable trimmers 217 and 218 to be pre-shaped. As already stated, said trimmers are not strictly necessary when soaps are of sizes inferior to those of pockets in the revolving die box.

After feeding into pockets 203–203', die box effects a 90° rotation bringing said pockets to the position of pockets 204–204'. As already disclosed, stamping operation occurs by means of the die halves 219, 220, 221 and 222, provided with the described air ejectors and cooling circuit ducts. Die halves 219, 220, 221 and 222 have the contour thereof exactly identical to the contour of the revolving die box pockets and of the stamped soaps.

Scrap soap, ejected from dies, is conveyed into the outlet channels 209, 209', 210, 211 and 211' and laterally contained between disks 207–208 so as not to fall down again between the die halves during the subsequent backward stroke of said dies.

After the backward stroke of the die halves, the die box effects a 90° rotation bringing the soaps to the discharge position, corresponding to the position of pockets 205–205'.

In said position (FIGURE 30), suckers 223–224 and pushers having resilient cushions 225–226 operate in a way to take stamped soaps and bring them out of pockets 205–205', separating soaps from scrap soap ejected from dies and collected in channels in the revolving die box.

Even in this case, suckers 223 and 224 are connected to a vacuum system in order to adhere soaps to be discharged, and to a compressed air source to separate soaps from suckers, after that sucker support has effected a 90° rotation to deposit soaps on the discharge conveyor 227.

Though not shown in FIGURE 30, it is possible to apply on the die box side, before the discharge conveyor, a pair of stiff or resilient trimmers, as disclosed in FIGURE 18, in order to achieve an accurate finishing of the stamped soap contour.

In the next 90° die box rotation, pockets assume the position 206–206', in which cleaning operation of the pockets takes place by means of brushes 228–229, said brushes being operated as previously described.

In FIGURES 32–34 there is illustrated an example of the solutions adopted to accommodate the embodiment shown in the preceding FIGURES 22–26 for a machine having only one die unit to a machine having two die half units.

Solution of FIGURES 32–34 relates to a revolving die box in which the inner pocket surface does not correspond, or corresponds only in particular parts, to the stamped soap contour.

In the example shown in the above figures, pocket contour corresponds to stamped soap contour only in correspondence with the largest soap sides, whereas the pocket contour, related to the smallest stamped soap sides, does not correspond to the soap contour, but has a different shape.

The revolving die box is composed by a central core 230, which releasably rotates for 90 degrees about axis 231 in the direction shown by arrow 329.

As previously stated, said central core carries on its two outer sides the two disks 232–232' and can be, for a convenient manufacture, cut into two parts with respect to the width thereof, said parts being joined together by screws (not shown).

In said core there are pockets 233–233', 234–234', 235–235' and 236–236', the contour of which is made in accordance with the method hereinabove stated.

In FIGURES 32 and 33 there is shown the particular embodiment providing for supply of soap blanks 237 by means of a single conveyor belt 238 placed on a side of the revolving die box.

Soaps 237 are directly pushed into pockets 233–233' by means of horizontal reciprocating motion pushers 239. In case of need, a single trimmer or a pair of trimmers can be interposed between the supply conveyor 238 and the side of the revolving die box, so that soap can be shaped while being pushed by pushers 239 into pockets 233–233'.

The feeding step being completed, die box effects a 90° rotation bringing pockets 233–233' to the position of pockets 234–234'.

As already disclosed, stamping occurs in said position by means of the pairs of horizontal reciprocating die halves 240–241 and 242–243, provided with the abovementioned ejectors 244–245–246 and 247.

In the stamping step (FIGURE 34) scrap soap ejected from dies is partially enclosed and compressed into the space beyond the die edge, coinciding with the soap contour, and is partially ejected through channels 250–252 provided for in the core width of the revolving die box, as described in connection with the similar application carried out for the revolving die box having only one pair of die halves (FIGURES 22–26). In this case, pockets 252 have an overall surface which is larger than the discharge ports 250.

After opening of die halves, the stamped soaps 248–249 remain attached to the die box pockets by means of the soap portions 250–251–252 which are compressed within the scrap soap outlet channels. In the next 90° rotation, pockets 234–234' assume the position of pockets 235–235'. Then, suckers 253–254 and pushers 255–256 operate the removal, according to the previously described process, of the finished soaps from the soap portions ejected through the outlet channels, and, when necessary, trimming the soap contours by passing them through the trimmer 257 made of a stiff or resilient material.

Stamped soaps, as previously disclosed, are deposited on the conveyor belt 258.

Finally, pockets 235–235' move to position 236–236' (FIGURE 36), wherein the cleaning step occurs by means of plunger 259 and brush 260.

For the construction of the revolving die boxes described in the various above-mentioned solutions, a metal (such as bronze, stainless steel, Monel metal, etc.) or a suitable plastic, stiffened by glass or cotton fibers, may be used.

Mowever, it can be conveniently used also as a combination of stiff materials and suitable resilient material.

With the stiff material (metal or stiffened plastics) all the die box is constructed, certain pocket surfaces being excluded. As a matter of fact, said surfaces are constructed in a suitable resilient material having the purpose of fitting, after completion of soap stamping, to the stamped soap contour, so as to enhance adherence between soap and die box, and assure immobility of the stamped soap in passing from the stamping to the discharge position.

This solution is particularly suitable for resilient soap stamping, i.e. soaps that just after stamping action show a slight shrink and do not, therefore, perfectly follow the die box pocket contour after stamping.

What is claimed is:

1. A machine for stamping tablets from substances having a pasty consistency which comprises:
   (A) interacting die halves operable to compress the substance, and to eject the excess quantity of said substance therefrom;
   (B) at least one revolving box defining a plurality of apertures; said apertures defining channels; said revolving box having an inside wall;
   (C) rotating means to rotate said revolving box on an axis parallel to the die halves;
   (D) said revolving box connected in operable position with respect to said die halves so that the excess substance ejected by said die halves upon compression thereof, is translated into said channels defined by the apertures of said revolving box to the inside wall of said revolving box, said excess substance adhering to said inside wall;
   (E) means to eject the formed tablets from said die halves into the apertures of said revolving box, the excess substance causing the tablets to adhere to the apertures when the die halves are withdrawn from each other;
   (F) means for discharging the stamped tablets from the apertures of said revolving box.

2. In the machine as described in claim 1, the combination of two revolving boxes, said revolving boxes being spacedly arranged relative to each other on an axis so that they revolve relative to each other, with mutual apertures facing each other to form a single passage through which the die halves penetrate.

3. The machine as described in claim 2, wherein said two die halves interact near the inner surface of one of said two revolving boxes, so that said one of said two revolving boxes operates as a trimmer for the material expelled from the two die halves during stamping of the tablet, and said other revolving box operates as a temporary container and feeder for the blank to be stamped.

4. The machine as described in claim 2, wherein said two revolving boxes define at least three apertures between them, wherein said substances are fed to the die halves through said first aperture; said tablets being stamped by said die halves in said second aperture; the stamped tablets being discharged from the revolving box through said third aperture.

5. The machine as described in claim 1, wherein an inclined scraper is connected to one of said revolving boxes to convey excessive substance to the outside of the revolving box for re-processing.

6. The machine as described in claim 2, wherein said machine has two pairs of die halves, and wherein said two revolving boxes have pairs of apertures distributed along the periphery thereof, and a sharp cutter mountably positioned between the pairs of apertures.

7. The machine as described in claim 2, wherein said two revolving boxes are combined into a single revolving box defining apertures and wherein discs are mounted to said combined revolving box to collect scraps ejected from the die halves during the stamping of the tablets.

8. The machine as described in claim 2, wherein both said revolving boxes comprise channels within said apertures to simultaneously allow the passage of excessive substances ejected from the die halves during the stamping of the tablets, and to provide a connection between the stamped tablet and the revolving boxes, to keep and transport the stamped tablet from the stamping position to the discharge position.

9. The stamping machine as described in claim 8, wherein said apertures define an inner wall, and wherein the clearance between the inner wall of the apertures of said revolving boxes, and said stamped material is not of uniform thickness.

10. The stamping machine as described in claim 8, wherein said revolving boxes are cylindrical in form, the outer surface thereof having a scraper attached for cutting and removing the excessive substance ejected from said channels.

11. The machine as described in claim 2, wherein the stamped tablets are discharged from the apertures by a vacuum-pusher and compressed air combination.

12. The machine as described in claim 2, wherein a plurality of trimmers are attached to the revolving boxes to clean the contour of the stamped tablets as they are discharged from said revolving box.

References Cited by the Examiner

UNITED STATES PATENTS

| | | | |
|---|---|---|---|
| 549,274 | 11/1895 | Mellen | 25—9 |
| 1,796,253 | 10/1931 | Jones | 25—9 |
| 1,956,532 | 4/1954 | Jones | 25—7 |
| 2,937,428 | 5/1960 | Pocidalo | 25—7 |

WILLIAM J. STEPHENSON, *Primary Examiner.*